Patented Aug. 1, 1950

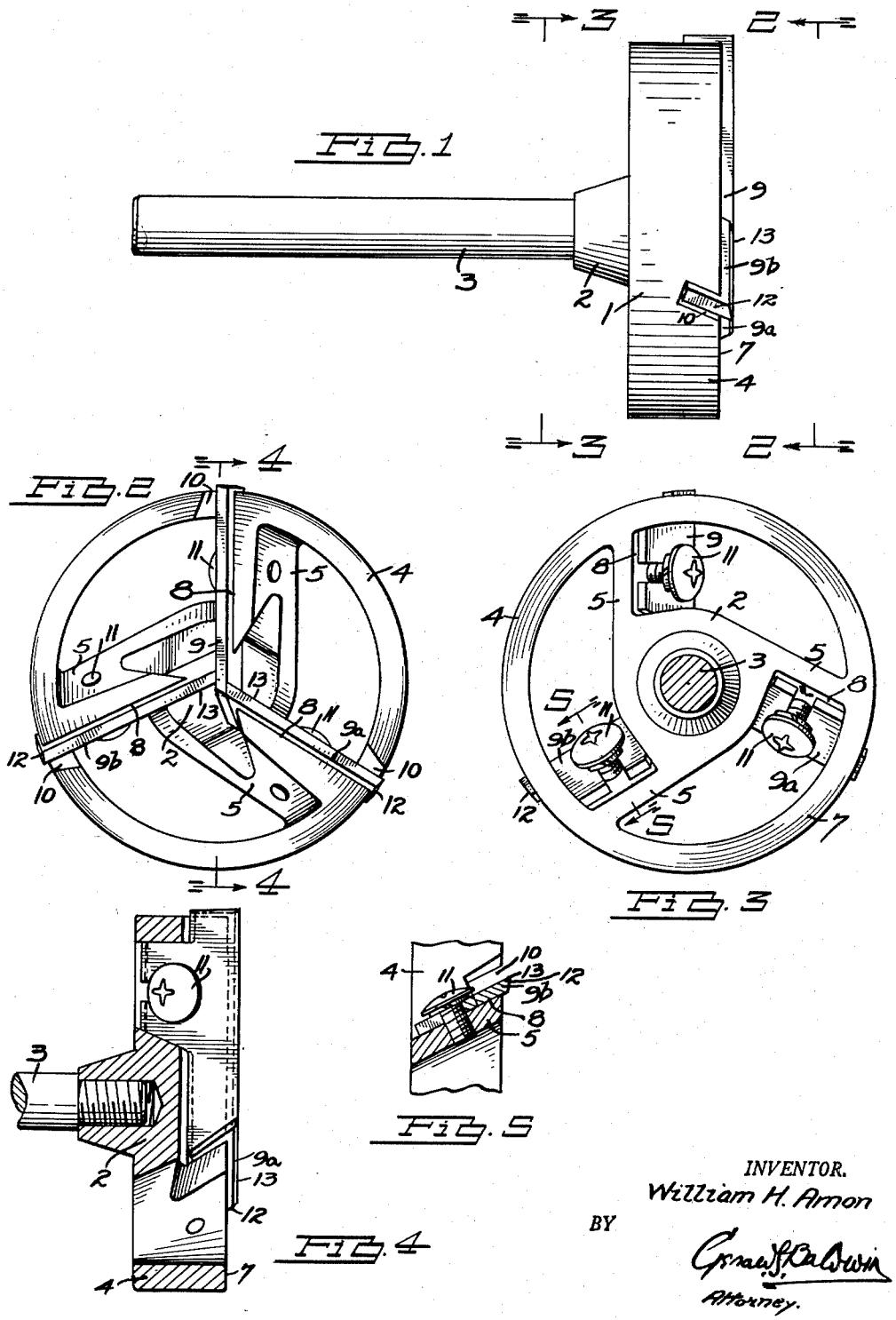

2,517,374

UNITED STATES PATENT OFFICE 2,517,374

ROTARY END THRUST CUTTER HEAD FOR WOODWORKING

William H. Amon, Detroit, Mich.

Application December 28, 1946, Serial No. 719,074

2 Claims. (Cl. 144—219)

This invention relates to improvements in rotary end thrust cutter heads for woodworking, and refers particularly to such a tool having a plurality of inserted blades for drilling, routing, planing and the like.

It is an object of the invention to provide rotary end thrust cutter heads for woodworking wherein a ring is provided integral with and concentric with the holder, and blades supported radially to project somewhat forwardly of the ring so that the latter functions both as a safety device and prevents the blades hogging into the work.

Another object of the invention is to provide rotary end thrust cutter heads for woodworking including a holder and a plurality of inserted blades the cutting edges of which all extend radially from the axis of the holder; and wherein the blades are so arranged that they support one another at their inner extremities.

A further object of the invention is to provide rotary end thrust cutter heads for woodworking having a unitary holder including a hub, spoke-like members extending therefrom, and a ring in which the outer extremities of the members terminate, so that each spoke-like member forms a backing to support one blade, and the ring is slotted from its front face immediately adjacent each member for the passage of a blade therethrough. Thus the diameter of a hole cut by the tool is somewhat greater than that of the ring and ample chip clearance is provided both outwardly of the ring and inwardly of the latter between the spoke-like members.

Having thus briefly stated some of the objects and advantages of the invention I will now describe it in detail with the aid of the accompanying drawing, in which:

Figure 1 is a side elevation of the tool.

Figure 2 is an end view taken on the line 2—2 of Figure 1.

Figure 3 is a section on the line 3—3 of Figure 1.

Figure 4 is a section on the line 4—4 of Figure 2, and

Figure 5 is a section on the line 5—5 of Figure 3.

Referring to the drawing, 1 designates a toolholder including a hub 2 provided with suitable means, such as a rearwardly projecting shank 3, for attachment to a chuck—not shown. Spaced concentrically around the hub 2 is a ring 4 integral with both of which are a plurality of substantially radial spoke-like members 5, each of which projects forwardly beyond the hub 2 with its front margin flush with the front face 7 of the ring 4. One side of each member 5, which is inclined to the axis of the holder 1, is flat to form a bearing face 8 against which one side of a blade 9, 9a or 9b rests. These blades project somewhat forwardly beyond the members 5 and the ring 4 and extend through slots 10 formed in the front face 7 of the said ring. Each blade 9, 9a and 9b, all of which are of different length, is transversely slotted intermediately of its length for the passage of a screw 11 in threaded engagement with the member 5 against which it bears. All the blades are wider intermediately of their length to bear against their respective members 5 throughout substantially the entire width of the latter; the outer extremities of the blades are narrower to reduce the depth of the ring slots 10 through which they extend; and the inner extremities of the blades are narrower to project inwardly in front of the hub 2. The cutting edges 13 of all the blades, which are usually flat throughout their length, are formed along the front blade sides and along the edges of the latter remote from the supporting members 5. The cutting edges of all the blades are radial to the hub axis, and the cutting edge of the longest blade 9 extends directly across the axis of the said hub 2. The blade 9b of intermediate length bears at its inner extremity against the side of the blade 9 along which its cutting edge is formed; and the shortest blade 9a bears at its inner extremity against the opposite side of the blade 9 and thus the inner extremity of its cutting edge is spaced from the hub axis a distance equal to the thickness of the blade 9. The outer extremity of each blade 9, 9a and 9b is of course the same distance from the axis of the hub 2. Outer cutting edges 12 may also be formed for the entire depth of the outer margins of the blades, and clearance is provided in the conventional manner behind all the cutting edges 13 and 12.

From the foregoing it will be clearly seen that a cut is taken right to the axis of the work, and that ample chip clearance is provided both between the spoke-like members 5 and also around the outer periphery of the ring 4. Moreover the faces 8 of the members 5 against which the blades 9, 9a and 9b rest are so inclined that chip clearance is further facilitated.

While in the above description the preferred embodiment of the invention has been described and shown it is understood that alterations and modifications may be made thereto provided they fall within the scope of the appended claims.

What I claim is:

1. A woodworking tool of the character described including a hub having means thereon for mounting it for rotation, spoke-like members extending substantially radially from the hub, a ring coaxial with the hub supported by the outer extremities of the members, a plurality of removable blades each secured against one side of one of the members and having a cutting edge formed along its front edge remote from the member against which the blade is secured, the cutting edges of all the blades being radial to the hub axis, the cutting edge of one blade extending across said axis, and the inner extremities of the other blades terminating against opposite sides of the said one blade.

2. The combination in claim 1, wherein the outer extremity of each blade is shallower than its intermediate portion and the front face of the ring is radially slotted for the passage of the outer extremity of each blade therethrough.

WILLIAM H. AMON.

REFERENCES CITED

The following references are of record in the file of this patent:

UNITED STATES PATENTS

| Number | Name | Date |
|---|---|---|
| 643,950 | Depoe | Feb. 20, 1900 |
| 706,078 | Mechlin | Aug. 5, 1902 |
| 1,249,332 | Cline | Dec. 11, 1917 |
| 1,446,194 | McCullough | Feb. 20, 1923 |
| 2,395,628 | Kocher | Feb. 26, 1946 |